United States Patent [19]

Moebius

[11] Patent Number: 4,670,818
[45] Date of Patent: Jun. 2, 1987

[54] PROJECTION HEADLIGHT FOR MOTOR VEHICLES

[75] Inventor: Wolfgang Moebius, Stuttgart, Fed. Rep. of Germany

[73] Assignee: Dr. Ing h.c.F. Porsche Aktiengesellschaft, Fed. Rep. of Germany

[21] Appl. No.: 776,883

[22] Filed: Sep. 17, 1985

[30] Foreign Application Priority Data

Sep. 17, 1984 [DE] Fed. Rep. of Germany ... 8427338[U]

[51] Int. Cl.⁴ .......................... B60Q 1/04; F21M 3/02
[52] U.S. Cl. ......................................... 362/61; 362/80; 362/331; 362/332
[58] Field of Search ....................... 362/61, 72, 83, 80, 362/309, 310, 311, 355, 284, 360, 304, 305, 332, 268, 303, 307, 331–336, 343, 346

[56] References Cited

U.S. PATENT DOCUMENTS 1,945,190 1/1934 Handlan ............................. 362/310
4,475,148 10/1984 Tomforde ............................. 362/80

FOREIGN PATENT DOCUMENTS 540584 3/1956 Italy ..................................... 362/72
261216 11/1926 United Kingdom ................ 362/360

OTHER PUBLICATIONS

German Article—"Verbesserungen des Automobil-Abblendlichtes durch Scheinwerfer mit Polyelliptischem System" by BOSCH Technische Berichte, Vorabdruck (May 1985).
Electrodyne, Headlight Covers, Fall 1980, p. 31.

Primary Examiner—William A. Cuchlinski, Jr.
Assistant Examiner—D. M. Cox
Attorney, Agent, or Firm—Barnes & Thornburg

[57] ABSTRACT

A projection headlight is provided for a motor vehicle wherein a projection lens is encased by a disk-shaped covering having a size larger than the surface area of the lens. A light passage area is provided in the covering and portion of the covering outside the light passage area is provided with a colored coating. The colored coating exhibits variations in light transmitting properties across the surface of the coated portion of the covering. The resulting headlight has a conventional size and the function of the lens is unimpaired.

12 Claims, 3 Drawing Figures

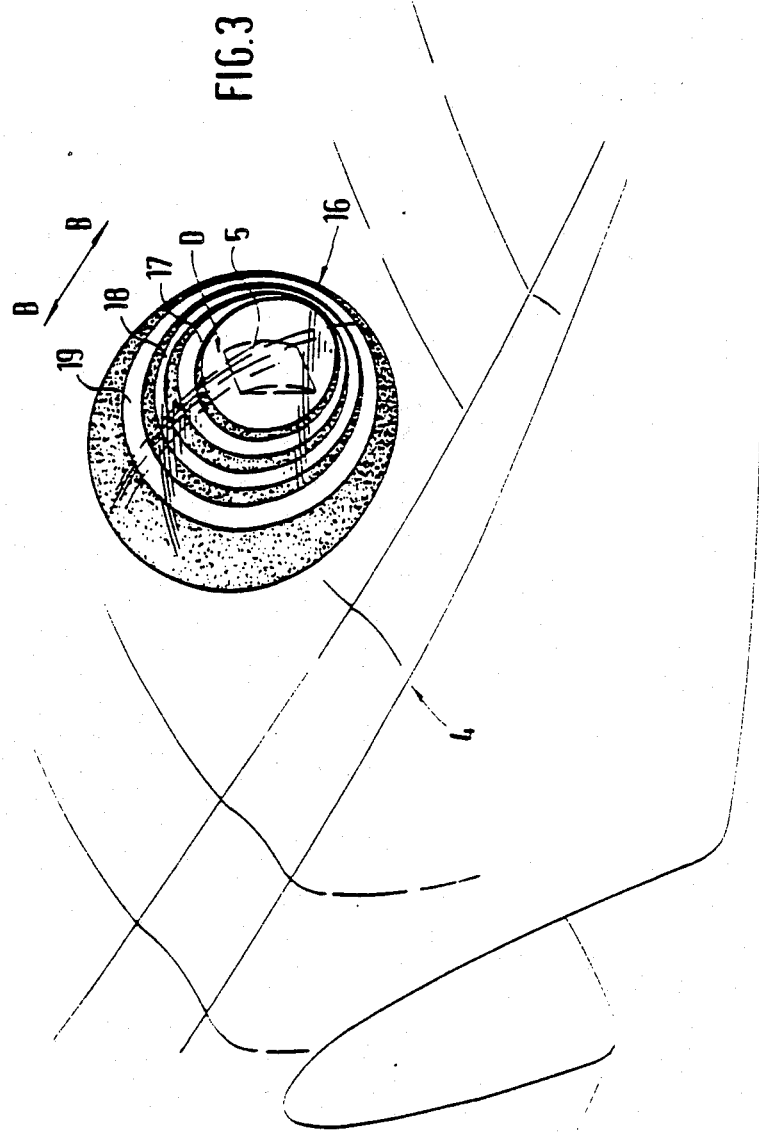

PROJECTION HEADLIGHT FOR MOTOR VEHICLES

BACKGROUND AND SUMMARY OF THE INVENTION

The present invention relates to a projection headlight for motor vehicles which is surrounded by an opening in the vehicle body.

Headlights which operate according to the projection principle have a projection lens that is relatively small in diameter and produces a very directed ray of light. As a result, the light-radiating surface on the body is much smaller than in the case of conventional headlights.

It is one objective of the present invention to provide the appearance of a headlight shape of conventional size in the body of a motor vehicle equipped with projection headlights.

It is another objective of the present invention to provide a covered projection lens for this type of headlight without impairment of its function.

In accordance with the present invention, these and other objectives are attained by the provision of a projection headlight including a projection lens encased in a disk-shaped covering means having a diameter larger that the lens diameter. A light passage area is provided in the covering means and the covering means is provided with a colored coating in regions outside the light passage area.

The main advantages achieved by the invention are that the covering provides the appearance of a conventional headlight while the projection lens is covered with a coated covering without impairment of the lens function. Because of the shape and size of the air discharge area and also because of a defined light transmitting capacity at the coating, a desired diffusion effect of the projection headlight is realized at the covering.

Further objects, features, and advantages of the present invention will become more apparent from the following description when taken with the accompanying drawings(s) which show, for purposes of illustration only, an embodiment/several embodiments in accordance with the present invention.

BRIEF DESCRIPTION OF THE DRAWINGS

FIG. 3 is a view corresponding to FIG. 2 of another embodiment in accordance with the present invention.

DETAILED DESCRIPTION OF THE DRAWINGS

Figure 1:
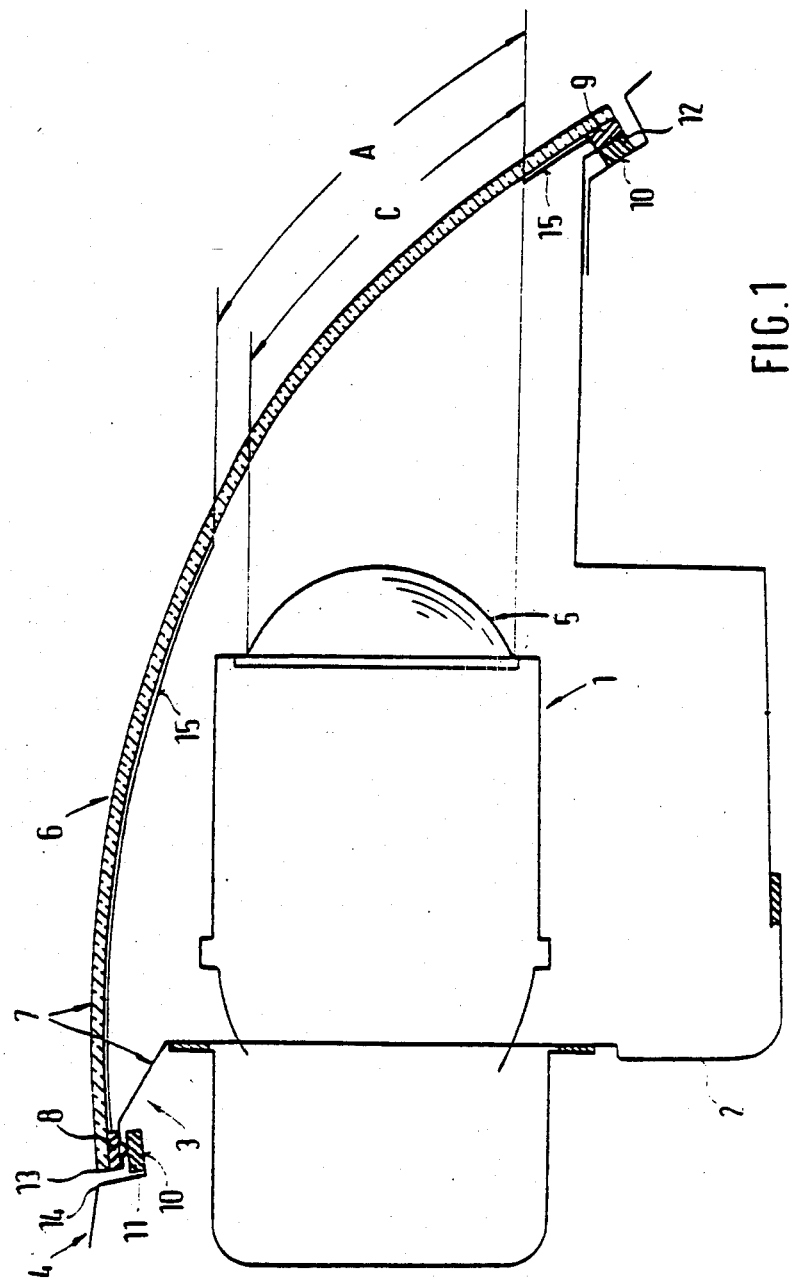
FIG. 1 is a longitudinal section of a motor vehicle in the area of a headlight with a cover according to the present invention.

A projection headlight having a light source 1 is disposed in a housing 2 which is installed in an opening 3 of a body 4 of a motor vehicle that is not shown in detail. The project headlight 1 has a projection lens 5 and is encased by means of a covering 6.

The oval-shaped covering 6 with the housing 2, forms a unit 7, the unit 7 being fitted together by means of elastic sealing means 8, 9. The unit 7 is supported by a receiving frame 10 delimiting the open 3. Sealing means 11, 12 are also provided between the receiving frame 10 and the unit 7. An edge 13 of the covering 6 is approximately flush with the contour 14 of the shell of the body 4.

The covering 6 which consists of glass, transparent plastic or a similar material, has the shape of a concave disk, the diameter of which is clearly larger than that of the projection lens 5, i.e. the surface area of the covering is greater than the surface area of the lens. In this case, the covering 6 is provided with a colored (preferably black) coating 15 outside a light passage area A.

Figure 2:
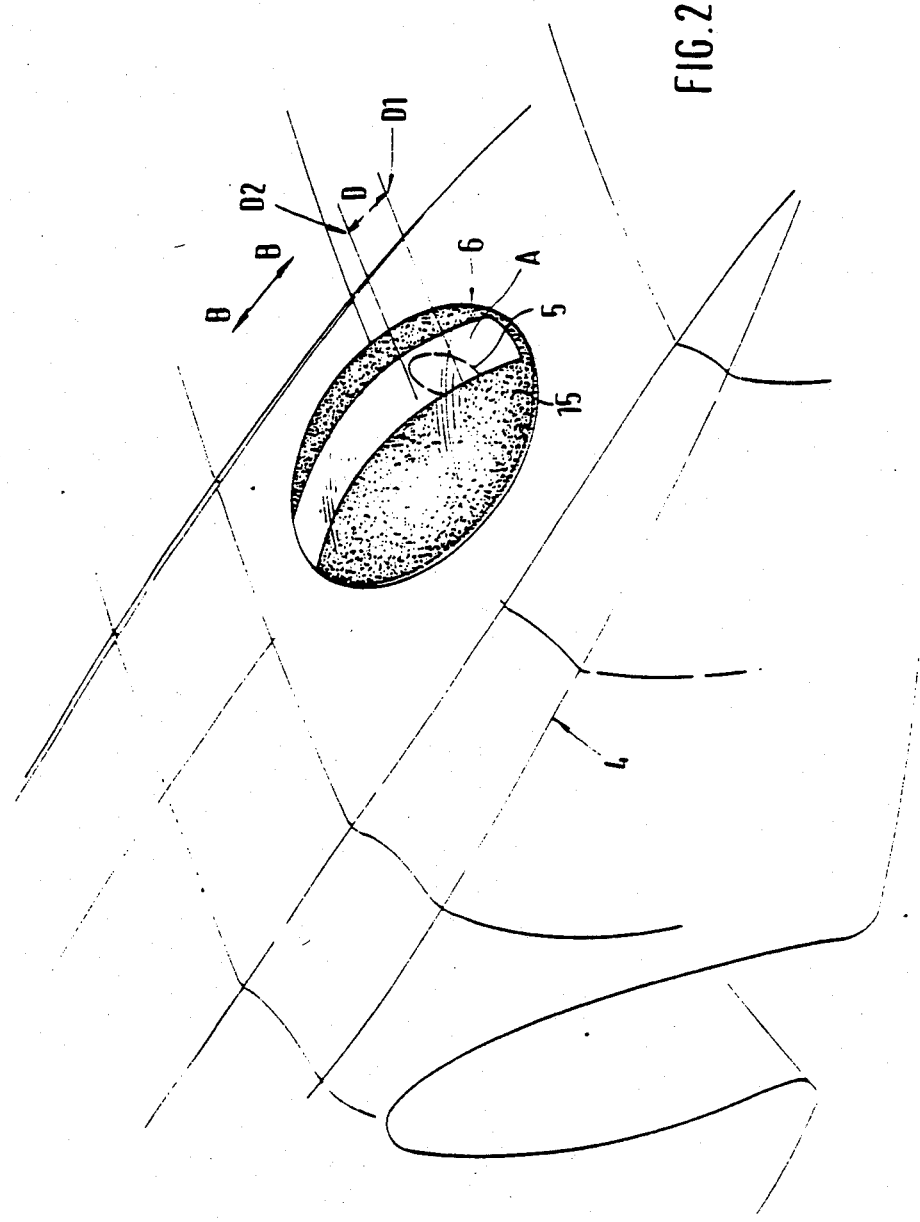
FIG. 2 is a diagonal view of the headlight.

According to FIG. 2, the light passage area A has the shape of a rectangle extending in the longitudinal direction B—B of the vehicle. The light passage area A is larger than the light emerging surface C formed by the projection lens 4 (FIG. 1) for the purpose of producing a diffusion effect. The coating 15, in this case, is designed in such a way that its light transmission varies for different areas. For example, the transmission of area D1 is higher than that of area D2.

In FIG. 3, the covering 16 has an oval light passage area D which is surrounded by several oval transparent rings 17, 18, 19 which result in diffused light.

What is claimed is:

1. A projection headlight for a motor vehicle comprising:
   projection light source means,
   projection lens means for producing a directed beam of light from said light source means, said lens means having a first surface area, and
   covering means for encasing the lens means, said covering means having a second surface area, said second surface area being greater than said first surface area, said covering means including a light passage area and an area exhibiting a colored coating,
   wherein said coating exhibits non-constant light transmission properties along a surface of said covering means, and
   wherein said covering means exhibits a greater light transmitting property at a front portion of said covering means that at a more rearward portion of said covering means.

2. Projection headlight according to claim 1, wherein said covering means comprises a disk-shaped covering.

3. A projection according to claim 1, wherein said light passage area has a rectangular shape.

4. A projection headlight according to claim 1, wherein said light passage area has a substantially circular shape.

5. A projection headlight according to claim 4, wherein said light passage area has an oval shape.

6. A projection headlight according to claim 5, wherein said light passage area is surrounded by at least one transparent oval ring.

7. A projection headlight according to claim 6, wherein said light passage area is surrounded by plurality of transparent oval rings.

8. A projection headlight according to claim 1, wherein said covering means has a concave shape.

9. A projection headlight according to claim 2, wherein said covering means has a concave shape.

10. A projection headlight according to claim 1, wherein said vehicle has a body exhibiting an outer contour adjacent said covering means, said covering means being flush with said outer contour.

11. A projection headlight according to claim 8, wherein said vehicle has a body exhibiting an outer contour adjacent said covering means, said covering means being flush with said outer contour.

12. A projection headlight according to claim 1, comprising housing means for housing said light source means and said lens means, said housing means and said covering means forming a unit removably engagable with an opening in said vehicle.

* * * * *